United States Patent [19]  [11] 4,329,101
Green et al.  [45] May 11, 1982

[54] BALE HANDLING APPARATUS

[75] Inventors: Allen P. Green, Visalia; Donald M. Grey, Selma, both of Calif.

[73] Assignee: Sperry Corporation, New Holland, Pa.

[21] Appl. No.: 161,719

[22] Filed: Jun. 20, 1980

[51] Int. Cl.³ ............................................. A01D 87/12
[52] U.S. Cl. .................................... 414/24.5; 414/111; 414/501
[58] Field of Search ...................... 414/24.5, 24.6, 111, 414/501, 900, 911; 410/47, 49

[56] References Cited

U.S. PATENT DOCUMENTS

| | | | |
|---|---|---|---|
| 3,941,265 | 3/1976 | Nunnally | 414/501 X |
| 3,942,666 | 3/1976 | Pfremmer | 414/24.5 X |
| 4,101,081 | 7/1978 | Ritter et al. | 414/24.5 X |
| 4,103,794 | 8/1978 | Shaw | 414/501 |
| 4,182,590 | 1/1980 | Harkness | 414/24.5 |
| 4,212,578 | 7/1980 | Butler | 414/900 |
| 4,259,034 | 3/1981 | Ward et al. | 414/24.6 |

FOREIGN PATENT DOCUMENTS

| | | | |
|---|---|---|---|
| 1011297 | 5/1977 | Canada | 414/24.5 |
| 2373224 | 7/1978 | France | |
| 7703683 | 10/1978 | Netherlands | 414/24.5 |
| 2026955 | 2/1980 | United Kingdom | 414/24.5 |

OTHER PUBLICATIONS

Benac RBR 4000 Automatic Round Bale Wagon Brochure; Mar. 1979.

Primary Examiner—Leslie J. Paperner
Attorney, Agent, or Firm—James R. Bell; Frank A. Seemar

[57] ABSTRACT

A bale handling apparatus picks up a load of large round bales from the field, transports the load and then dumps the load at a storage area. The apparatus includes a transporter bed and has the ability to arrange and control the position of the bales on the bed after being picked up. The versatile apparatus is preferably self-propelled to function as both an on-road and off-raod vehicle.

10 Claims, 8 Drawing Figures

BALE HANDLING APPARATUS

BACKGROUND OF THE INVENTION

This invention relates generally to material or article handling and, more specifically, to vehicles which are self-loading or unloading and include successive handling means.

The evolution of the hay industry in recent years indicates a diversification in baling, storing and transporting hay with a strong trend toward using larger bales. Large round bales, varying in weight from about 800 pounds to about 1600 pounds and varying in width from about four feet to about six feet, are rapidly replacing the relatively smaller conventional bales.

Due to the large size of round bales, there is a need for equipment which can pick up the bales in the field, transport the bales to a remote storage area and deposit or dump large loads of round bales at the storage area. Also, such equipment must be flexible in the ability to deal with bales ranging in width from the aforesaid four to six feet. Furthermore, it is important that the bale handling equipment be able to arrange and control the position of bales on the transporter bed after the bales have been picked up. Transporting larger loads of bales reduces fuel usage and the time required for bale handling.

Currently known round bale equipment is limited in being able to successfully pick up, transport and dump large loads of round bales, e.g., eight to ten bales, and cope with the varying bale size. Some equipment is available for handling large loads of bales but this equipment is tractor drawn and is thus limited by tractor speed and reduced maneuverability. Other equipment available is self-propelled, such as a pickup truck attachment for handling large bales. While this other equipment avoids the speed and maneuverability limitations of tractor drawn equipment, it sacrifices the economic advantage associated with transporting a large number of bales.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a bale handling apparatus including a bed and means for picking up a first bale and depositing the first bale on the bed. The first bale is retained in a first position on the bed. Means are provided to arrange or move the bale on the bed to a desired position and to retain the bale on the bed so as not to interfere with depositing subsequent bales on the bed.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 8 is an enlarged partial view illustrating an embodiment of the cross conveyor of this invention connected to an associated hydraulic actuator.

DESCRIPTION OF THE PREFERRED EMBODIMENT

Figure 1:
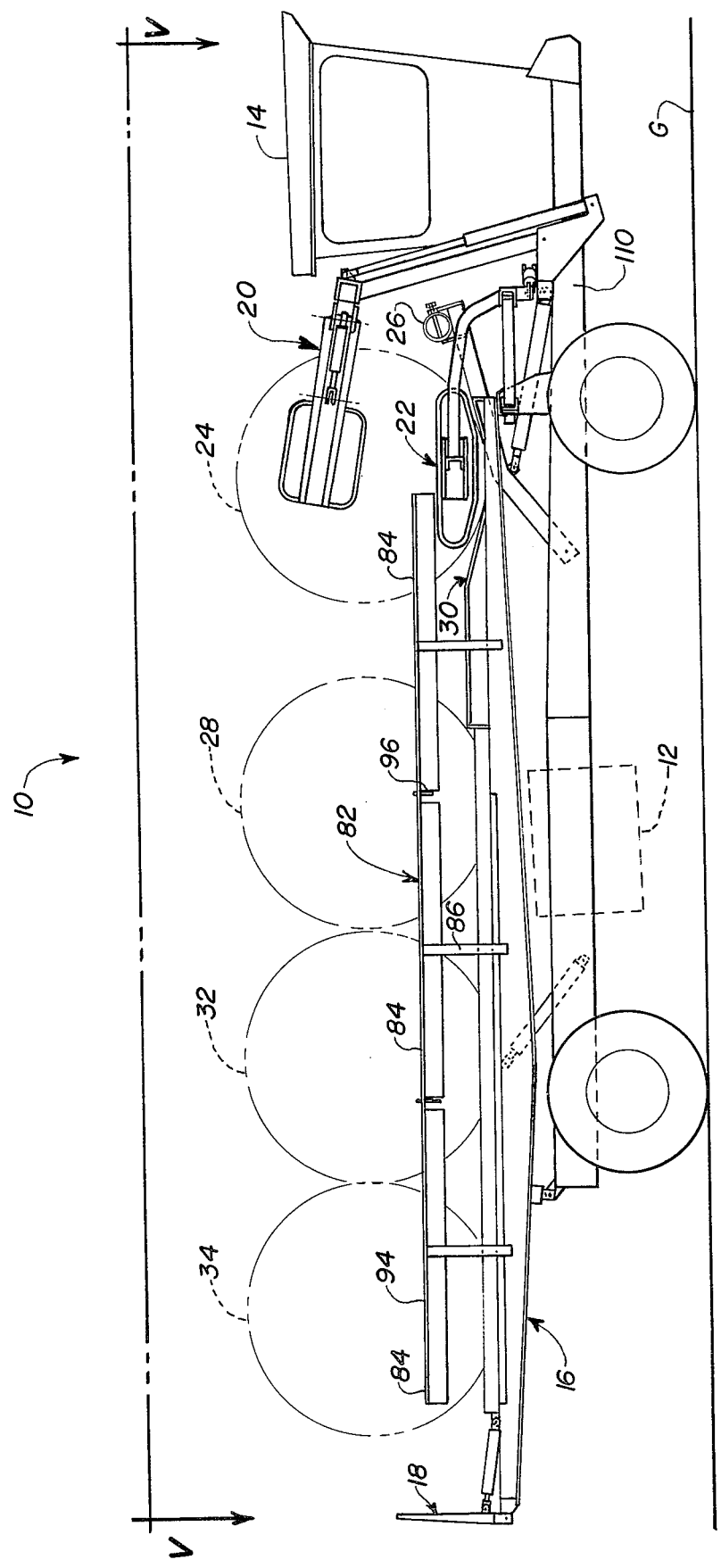
FIG. 1 is a side elevational view illustrating an embodiment of the bale handling apparatus of this invention.

The figures illustrate an embodiment of the bale handling apparatus of this invention. In essence the apparatus, generally designated 10, has the ability to function as an off-road agricultural vehicle capable of good maneuverability and low speed for picking up bales, and also has the ability to function as an over the road vehicle having a maximum speed of about 50 mph.

Vehicle 10 (FIG. 1) is a self-propelled, preferably by a 354 cubic inch engine 12 sold under the tradename PERKINS. Suitable steel is used to construct the vehicle 10 sufficient to safely handle loads equivalent in weight to 8-6 foot wide bales or 10-4 foot wide bales. An appropriate under carriage 110 and transmission are matched to satisfy the vehicle load requirements. Components are commercially available. A comfort-type cab 14 may include air conditioning and a stereo sound system if desired. Cab 14 is offset to the far side of vehicle 10 as viewed in FIG. 1.

Vehicle 10 includes a pivotal bed 16 having a pivotal tailgate 18. Means 20 is provided beside cab 14 for sequentially picking up round bales from adjacent ground surface G, and then pivoting to deposit the bales on bed 16. Means 22 is provided for pivoting to cross convey the bales on the bed 16 from a position where the bales were deposited to another position behind cab 14, thus forming a first double wide row 24 of bales. Means 26 can be pivoted to urge or advance bales from first row 24 to a second row position 28. The sequence is repeated until bed 16 holds a full load of bales.

A major feature of this invention includes means 30 for retaining bales in a first row position 24 during deposit by pickup means 20, during cross-conveying by means 22 and, after the bales are advanced to second row position 28 by means 26, means 30 retains the bales positioned in row 28 so as not to interfere with subsequent bales being deposited and cross-conveyed in row 24. Of course, once bales fill both rows 24, 28, means 26 advances both rows so that eventually third, fourth rows 32, 34, etc. are occupied. Here once again, means 30 continues to perform multiple functions of retaining and guiding bales positioned for deposit and cross-conveying, and positioned so as not to interfere with subsequent bales being deposited and cross-conveyed.

Once bed 16 is filled, the bales can be transported to a storage site. There, bed 16 can be pivotally raised to a dump position and gate 18 can be pivotally lowered to release and dump the bales where desired. The sequence can be repeated until all bales are picked up from the bale forming site in the field and deposited in the desired storage area.

The means 20 for picking up and depositing bales, means 22 for cross-conveying, means 26 for advancing pivoting of bed 16 and pivoting of gate 18 are all actuated preferably by means of a hydraulic system including hydraulic cylinders and appropriate controls. Such a system can be constructed from commercially available components. Of course, electronic controls can be used also, either wholly or in combination with hydraulics. However, it is preferred to use a fully hydraulic system for maximum economy. For purposes of this invention, it has been found that a suitable hydraulic system requires a maximum operating capability of about 2000 psi.

Figure 4:
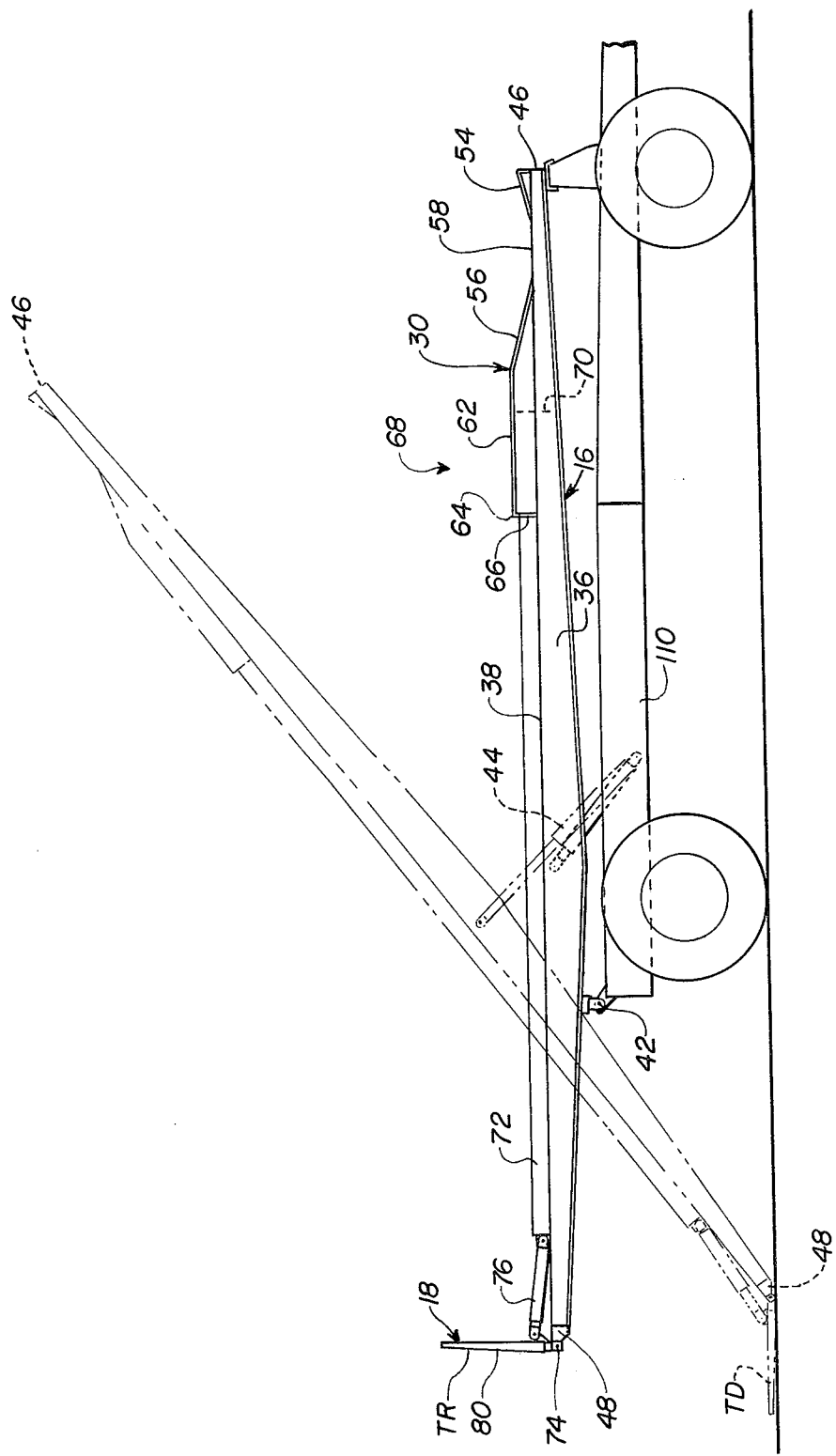
FIG. 4 is a partial side elevational view illustrating an embodiment of the dump bed of this invention.
Figure 5:
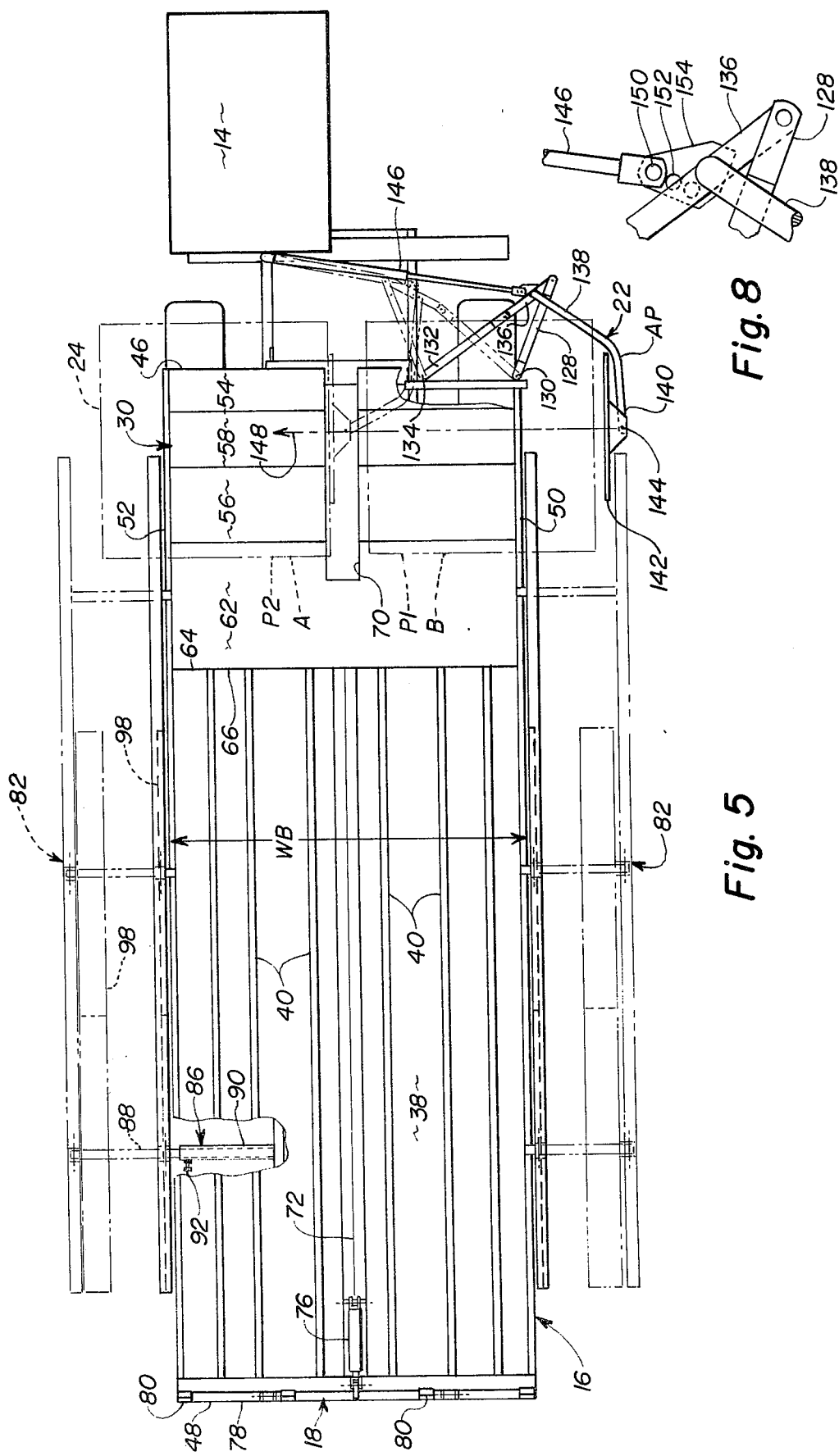
FIG. 5 is a top view illustrating an embodiment of the bale handling apparatus of this invention taken along line V—V of FIG. 1.

Bed 16, FIGS. 4 and 5, includes suitable steel frame members 36 (only one shown) for support. A bed surface 38 is of sheet steel welded to frame 36 and may include a plurality of grooves 40 for added strength. Bed 16 is pivotally connected to undercarriage 110 of vehicle 10 at a pivot point 42. A pair of hydraulic cylinders 44 (only one shown) are operably connected for pivoting bed 16 to a dumping position so that a first end 46 is raised and a second end 48 is lowered for dumping bales.

First end 46 of bed 16, adjacent cab 14, includes retainer means 30 which extends from a first side 50 to a second side 52. Retainer 30 includes a first ramp 54 immediately adjacent first end 46 and a second ramp 56 spaced from end 46. A recessed portion 58 separates ramps 54, 56. In this manner, a cradle-like first portion 60 of retainer 30 is formed for receiving deposited bales and guiding cross-conveyed bales in first row 24. Retainer 30 also includes a raised, substantially planar portion 62 extending from ramp 56. Portion 62 terminates abruptly at an edge 64 which joins surface 38 of bed 16 to form a stop 66. In this manner, a second portion 68 of retainer 30 is formed for retaining bales advanced by advance means 26 in second row 28 so as not to interfere with subsequent bales being deposited and cross-conveyed in first row 24.

A slot 70 is formed in bed 16 and retainer 30. Slot 70 extends from first end 46 to portion 62 for accommodating pivotal movement of advance means 26, see also FIG. 3. A raised separator 72 extends from stop 66 to second end 48 of bed 16. Separator 72 substantially divides bed 16 into halves for maintaining separation of the double wide rows of bales.

Second end 48 of bed 16 includes gate 18 pivotally connected to bed 16 at a pivot point 74. A hydraulic cylinder 76 is operably connected for pivoting gate 18 from a bale retaining position TR to a bale dumping position TD. Gate 18 includes a main cross member 78 which interconnects and supports pickets 80.

Figure 7:
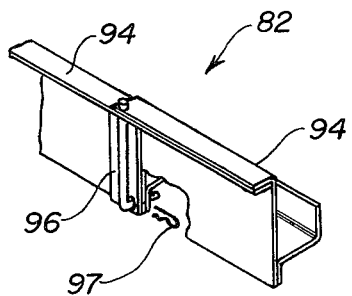
FIG. 7 is an enlarged partial view illustrating an embodiment of pins interlocking portions of the side rails of this invention.

A pair of side rails 82, FIGS. 1, 5 and 7, are connected to sides 50,52 of bed 16. Each rail 82 is connected for extending from and retracting to sides 50,52. Rails 82 are separated into a plurality of sections 84. Each section includes a single telescoping mount 86 having a first member 88 slidably mounted in a second member 90. Mounts 86 are secured in a desired position by any suitable means. Preferably though, a set screw 92 is used to secure the mounts in position. In this manner, the width of bed 16 is increased or decreased to accommodate different size bales. Also, when side rails 82 are fully retracted, the width of bed 16 satisfies the eight foot requirement for over the road operation without the need for a permit. A rail portion 94 secured to each mount 86 is connected to adjacent rail portions 94 by interlocking pins 96,97. Side rails 82 also include bed extensions 98 connected to side rails 82 and pivotal to a position lying substantially in a plane with surface 38 of bed 16. This provides support for the edges of bales when side rails 82 are extended and also provides means for adjusting a first width WB of bed 16.

As an example only, the discussion herein is directed to loading bales in a two wide, side-by-side arrangment of five or six foot round bales, it is recognized that with modification to bed 16, bale retainer means 30 can be used in in combination with a three wide side-by-side arrangement of four foot bales or a single wide arrangement of possible eight foot bales. The three wide arrangement would, of course, require two operations of cross-conveyor means 22 whereas the single wide arrangement would not require any operation of the cross conveyor means 22. In any of the above described arrangements, bale retainer means 30 will function to retain a bale or bales in a certain position after being deposited by pick up means 20, and then, after movement of the bale or bales by advance means 26, retainer means 30 will function to retain same at another position so as not to interfere with subsequent bales being deposited and cross-conveyed. Appropriate hydraulic controls can be provided to cope with any of the above arrangements. Such provision would require flexibility in selection or sequencing of pickup 20, cross-conveyor 22 and advancer 26.

Figure 2:
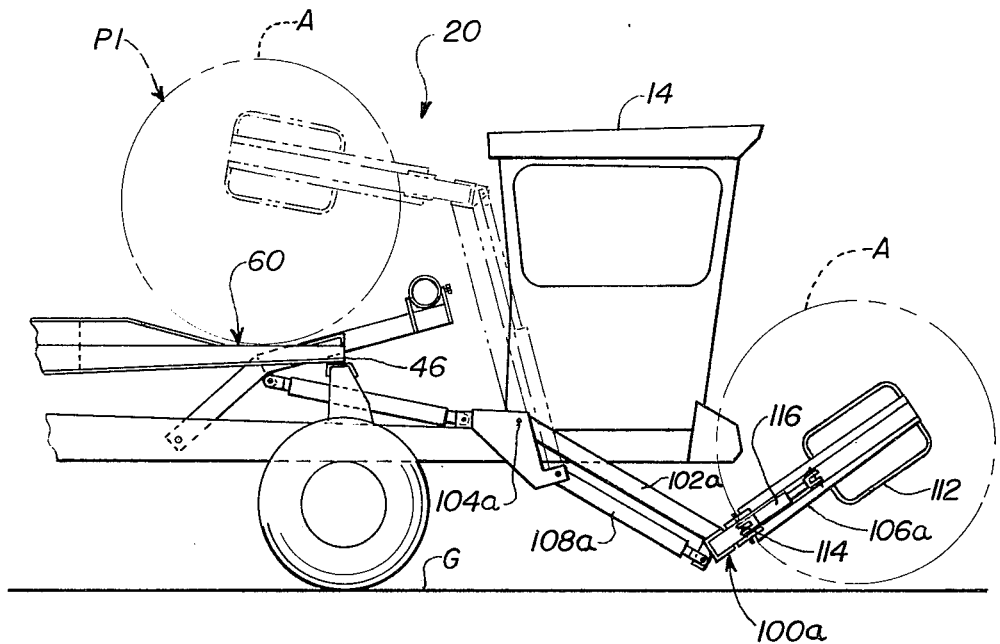
FIG. 2 is a partial side elevational view illustrating an embodiment of the bale pick up means of this invention.
Figure 6:
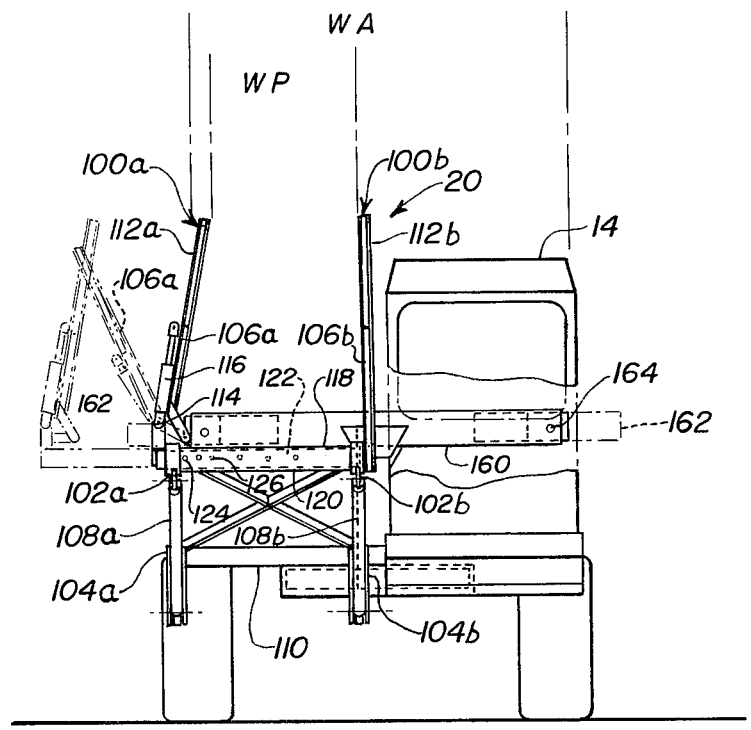
FIG. 6 is a partially cut-away frontal view illustrating an embodiment of the bale handling apparatus of this invention.

Pickup means 20, FIGS. 2 and 6, is connected to frame 36 of vehicle 10 adjacent first end 46 of bed 16 and also positioned beside offset cab 14. In this manner, maximum visibility is available to an operator positioned in cab 14.

Pickup means 20 is illustrated in a solid line pickup position picking up a bale A from adjacent ground surface G. Pickup means 20 is also illustrated in a dotted line position depositing bale A in engagement with first portion 60 of retainer 30 on bed 16. Pickup 20 includes a pair of arms 100a,b. Each arm includes a first portion 102a,b pivotally connected at 104a,b to a portion of undercarriage 110 of vehicle 10 and a second portion 106a.b connected to first portion 102a,b. A pair of hydraulic cylinders 108a,b are operably connected between undercarriage 110 and each arm 100a,b for pivoting arms 100a,b between the pickup and deposit positions previously described.

Each arm 100a,b also includes an enlarged frame-like member 112a,b connected at one end to provide an enlarged area of engagement with a bale. Portion 106b of arm 100b located immediately adjacent cab 14, is fixedly attached to its respective first portion 102b. However, portion 106a of arm 100a located not as immediately adjacent cab 14, is pivotally attached to its respective first portion 102a at 114. Another hydraulic cylinder 116 is operably connected for pivotally moving portion 106a toward and away from portion 106b thus providing a secure squeeze-like engagement for picking up and depositing bales.

A cross member 119 interconnects arms 100a,b. Cross member 118 includes a first portion 120 and a cooperating telescoping portion 112 slidingly engaged with member 120. A pin 124 can be inserted at selected ones of a plurality of matched holes 126. Thus, pickup means 20 has a first width WP as viewed in FIG. 6, and that width is adjustable by means of selected adjustment of telescoping portion 122 and securing pin 124 in the appropriate one of the matched holes 126.

Cross-conveyor means 22, FIGS. 1 and 5, is pivotally connected to undercarriage 110. A linkage includes a first member 128 pivotally connected to undercarriage 110 at 130, a second member 132 pivotally connected to undercarriage 110 at 134, and a third member 136 pivotally interconnecting members 128 and 132. A cross conveyor arm 138 is connected to third member 136 preferably by welding. At one end 140 of arm 138 a frame like member 142 is pivotally connected at 144 for continuously engaging and following a bale during cross-conveying. A hydraulic cylinder 146 is operably connected to the undercarriage 110 and to arm 138 for moving arm 138 during cross conveying. The above described linkage is of a construction sufficient for moving end 140 of arm 138 substantially in a straight line as indicated by an arrow designated 148. This provides minimum distortion of the cross-convey path of a bale. By attachment of an end 150 of hydraulic member 146 to one of a selected hole 152 provided at an end 154 of arm 138, the initial position AP of arm 138 can be adjusted relative to bed 16 (see also FIG. 8).

Figure 3:
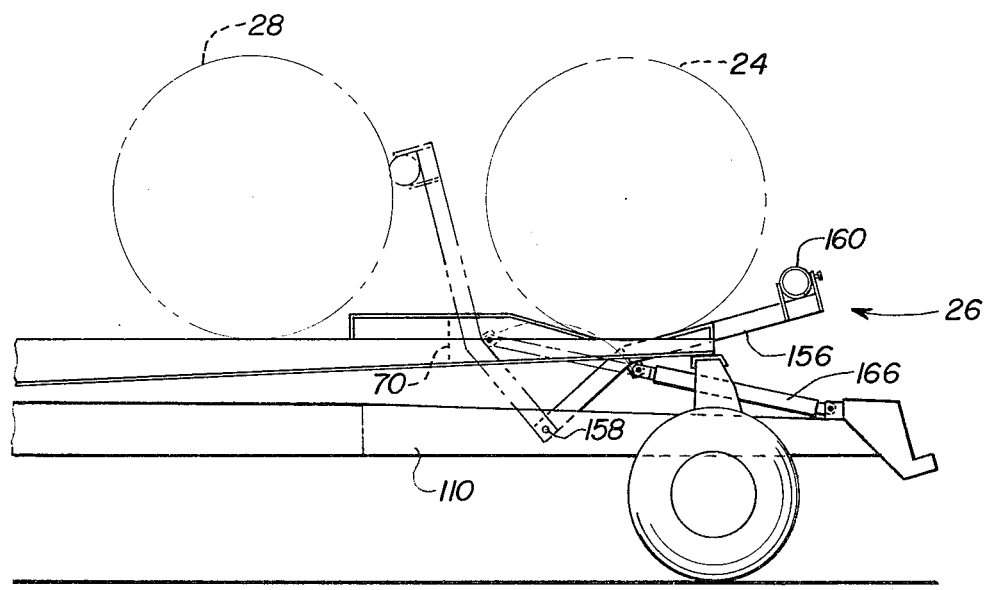
FIG. 3 is a partial side elevational view illustrating an embodiment of the bale advance means of this invention.

Advance means 26, FIGS. 3 and 6, includes a first member 156 pivotally connected to undercarriage 110 at 158. A transversely disposed member 160 is connected to first member 156 and is substantially tubular including tubular extensions 162 telescopingly mounted in member 60. Extensions 162 can be moved for adjusting the first width WA of advancer 26 when different size bales are to be encountered. Extensions 162 are secured in a desired position with member 160 by means of set screws 164. A hydraulic cylinder 166 is operably connected to the undercarriage and first member 156 for pivoting advancer 26 in slot 70 and thereby moving bales from a first row position 24 to a second row position 28.

With the parts assembled as set forth above, vehicle 10 is maneuvered over the ground surface G traveling the same path as a baler and approaching a scattered array of round bales left in a field by the baler. Pickup means 20 is lowered into the solid line pickup position for picking up a bale A. Pickup means 20 is then rotated to the dotted line position for depositing bale A in a first position P1 in first portion 60 of retainer 30. Then as pickup means 20 rotates, returning down to the pickup position, cross-conveyor means 22 urges bale A to a second position P2 in first portion 60 of retainer 30. Thus, first portion 60 of retainer 30 retains bale A in a first position P1, in a second position P2 and guides the travel of bale A from the first to the second position.

Subsequently, bale B is picked up and deposited in the first position P1 by pickup means 20 and bales A,B form a two wide side-by-side first row 24 of bales in first portion 60 of retainer 30.

Advance means 26 is then actuated for urging first row 24 to the second row 28 position. The bales A,B are retained in the second row 28 by stop 66 and are displaced from first row 24 so as not to interfere with subsequent bales being placed in the first row 24.

The cycle is repeated until third and fourth rows 32,34 are filled. This operation is accomplished as vehicle 10 moves over ground surface G at a substantially constant speed of about four miles per hour. Once bed 16 is filled with a load of bales, vehicle 10 is driven to a selected storage area where the load of bales is dumped by actuating bed 16 and gate 18.

Repeated loading, transporting and dumping will quickly and efficiently move a large number of bales from the scattered array of bales in the field.

The foregoing has described a bale handling apparatus adaptable for continuous movement at a substantially constant speed while picking up many large round bales, arranging the bales in rows on a bed of the apparatus and subsequently depositing the rows of bales at a storage area.

It is anticipated that aspects of the present invention, other than those specifically defined in the appended claims, can be obtained from the foregoing description and the drawings.

Having thus described the invention, what is claimed is:

1. Apparatus for picking up, transporting and dumping round bales, comprising:
   (a) a bed,
   (b) a bale retainer connected to said bed, said retainer having a first portion and a second portion spaced from said first portion;
   (c) means for picking up a first bale and depositing said first bale on said bed in a first position of a first row in engagement with said first portion of said retainer, said means for picking up being at a first end of said bed;
   (d) means for urging said first bale in engagement with said retainer from said first position to a second position of said first row;
   (e) said means for picking up said first bale, also picking up a second bale and depositing said second bale in said first position of said first row in engagement with said first portion of said retainer,
   (f) means for simultaneously urging said first and second bales from said first row to a second row on said bed into engagement with said second portion of said retainer; and
   (g) a gate connected to a second end of said bed, said gate being pivotal between a first position retaining said bales on said bed during picking up and transporting, and a second position permitting said bales to be dumped from said bed, said bed being pivotal between a first position supporting said bales during picking up and transporting, and a second position wherein said first end is raised to a position higher than said second end during dumping.

2. The apparatus of claim 1 wherein said bed has a first width and includes means for adjusting said first width to a second width.

3. The apparatus of claim 1 including:
   means for adjusting said bed between first and second widths, said means including side rails telescopingly mounted on said bed.

4. The apparatus of claim 1 wherein said bed includes first and second sides, said bed having a separator extending substantially from said first end to said second end, said separator raised relative to said bed and being of a construction sufficient for separating bales adjacent said first side from bales adjacent said second side.

5. The apparatus of claim 1 including:
   fluid power means operably connected for moving said means for picking up bales.

6. The apparatus of claim 1 including:
   fluid power means operably connected for moving said means for urging bales from said first to said second position of said first row.

7. The apparatus of claim 1 including:

fluid power means operably connected for pivoting said gate.

8. The apparatus of claim 1 including:
fluid power means operably connected for pivoting said bed.

9. The apparatus of claim 1 wherein said apparatus is self-powered.

10. The apparatus of claim 1 including:
fluid power means operably connected for moving said means for simultaneously urging said bales from said first to said second row.

* * * * *